(12) United States Patent
Dai et al.

(10) Patent No.: US 9,275,670 B2
(45) Date of Patent: Mar. 1, 2016

(54) METHODS OF PRODUCTION FOR CORROSION-RESISTANT BIT PATTERNED MEDIA (BPM) AND DISCRETE TRACK MEDIA (DTM)

(71) Applicant: HGST Netherlands B.V., Amsterdam (NL)

(72) Inventors: Qing Dai, San Jose, CA (US); Bruno Marchon, Palo Alto, CA (US); Katsumi Mabuchi, Ibaraki (JP); Mina Amo, Ibaraki (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/223,851

(22) Filed: Mar. 24, 2014

(65) Prior Publication Data

US 2014/0199501 A1    Jul. 17, 2014

Related U.S. Application Data

(62) Division of application No. 13/466,970, filed on May 8, 2012, now Pat. No. 8,717,710.

(51) Int. Cl.
*G11B 5/84* (2006.01)
*B32B 9/00* (2006.01)
(Continued)

(52) U.S. Cl.
CPC ... *G11B 5/84* (2013.01); *B32B 9/00* (2013.01); *G11B 5/72* (2013.01); *G11B 5/746* (2013.01); *G11B 5/8412* (2013.01); *G11B 5/855* (2013.01)

(58) Field of Classification Search
USPC .......... 427/128, 129, 130, 131, 132; 428/833.3, 833.6, 835.7, 835.8, 840.4, 428/841.3, 826, 846, 847.8
See application file for complete search history.

(56) References Cited

U.S. PATENT DOCUMENTS

| | | | |
|---|---|---|---|
| 4,735,848 A * | 4/1988 | Kondo | G11B 5/725 427/128 |
| 4,983,455 A | 1/1991 | Wakai et al. | |

(Continued)

FOREIGN PATENT DOCUMENTS

| | | |
|---|---|---|
| JP | 58194135 | 11/1983 |
| JP | 1078415 | 3/1989 |

(Continued)

OTHER PUBLICATIONS

Requirement for Restriction/Election for U.S. Appl. No. 13/466,970, dated Jul. 8, 2013.

(Continued)

*Primary Examiner* — Michael Cleveland
*Assistant Examiner* — Tabassom Tadayyon Eslami
(74) *Attorney, Agent, or Firm* — Zilka-Kotab, PC

(57) ABSTRACT

A method for producing a magnetic recording medium in one embodiment includes forming a magnetic material layer above a substrate, transferring an uneven pattern to the magnetic material layer to form concave portions and convex portions, the convex portions being magnetic regions, depositing a nonmagnetic material above the concave portions to form nonmagnetic regions, forming an oxide layer and/or hydroxide layer above the magnetic regions of the recording layer, and forming an organic material layer which exhibits a corrosion-inhibiting characteristic with respect to cobalt or cobalt alloy above the oxide layer and/or hydroxide layer.

17 Claims, 11 Drawing Sheets

(51) Int. Cl.
*G11B 5/72* (2006.01)
*G11B 5/855* (2006.01)
*G11B 5/74* (2006.01)

(56) References Cited

U.S. PATENT DOCUMENTS

| | | | |
|---|---|---|---|
| 5,316,573 A | | 5/1994 | Brusic et al. |
| 5,853,871 A | | 12/1998 | Kitaori et al. |
| 6,048,827 A | * | 4/2000 | Fukuchi ............ 508/582 |
| 7,112,377 B2 | | 9/2006 | Itoh et al. |
| 7,225,528 B2 | | 6/2007 | Suwa et al. |
| 7,682,711 B2 | | 3/2010 | Hattori et al. |
| 8,168,312 B2 | | 5/2012 | Horiguchi |
| 8,252,437 B2 | | 8/2012 | Rawat et al. |
| 8,717,710 B2 | | 5/2014 | Dai et al. |
| 2004/0209123 A1 | | 10/2004 | Bajorek et al. |
| 2008/0096389 A1 | | 4/2008 | Feng et al. |
| 2009/0052083 A1 | | 2/2009 | Nishikawa et al. |
| 2009/0067092 A1 | | 3/2009 | Suwa et al. |
| 2009/0067093 A1 | | 3/2009 | Haginoya et al. |
| 2009/0208778 A1 | | 8/2009 | Horiguchi |
| 2010/0059476 A1 | * | 3/2010 | Yamamoto et al. ........ 216/22 |
| 2010/0232056 A1 | | 9/2010 | Fukushima et al. |
| 2010/0273026 A1 | | 10/2010 | Riemer et al. |
| 2010/0323223 A1 | * | 12/2010 | Mabuchi ............ G11B 5/855 428/800 |
| 2011/0019307 A1 | | 1/2011 | Arai et al. |
| 2012/0008228 A1 | * | 1/2012 | Mabuchi et al. ............ 360/55 |
| 2012/0107646 A1 | | 5/2012 | Rawat et al. |
| 2012/0115250 A1 | | 5/2012 | Ariga et al. |
| 2013/0301157 A1 | | 11/2013 | Dai et al. |

FOREIGN PATENT DOCUMENTS

| | | | |
|---|---|---|---|
| JP | 4276312 | | 10/1992 |
| JP | 07085406 | | 9/1995 |
| JP | 0991662 A | | 4/1997 |
| JP | 07249048 | * | 4/1997 |
| JP | 03286291 | | 5/2002 |
| JP | 2006092659 | | 4/2006 |
| JP | 2006120222 | | 5/2006 |
| JP | 2006228282 | | 8/2006 |
| JP | 2007184019 | | 7/2007 |
| JP | 2008217959 | | 9/2008 |
| JP | 2009163781 | | 7/2009 |

OTHER PUBLICATIONS

Ex Parte Quayle Action for U.S. Appl. No. 13/466,970, dated Sep. 3, 2013.
Notice of Allowance for U.S. Appl. No. 13/466,970, dated Dec. 17, 2013.
Dai et al., U.S. Appl. No. 13/466,970, filed May 8, 2012.

* cited by examiner

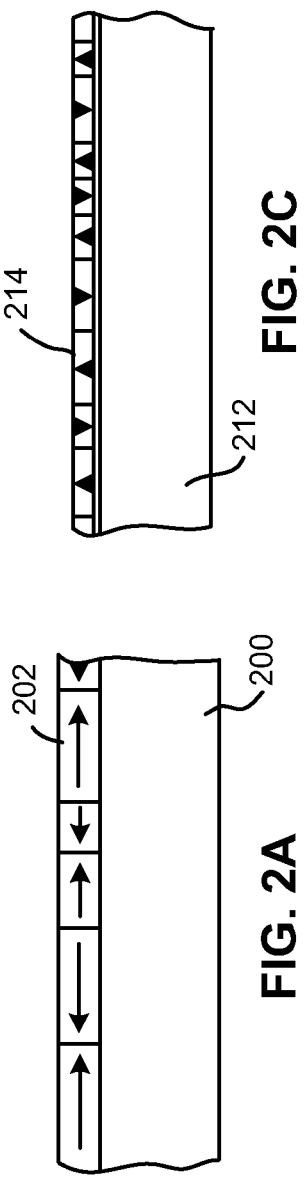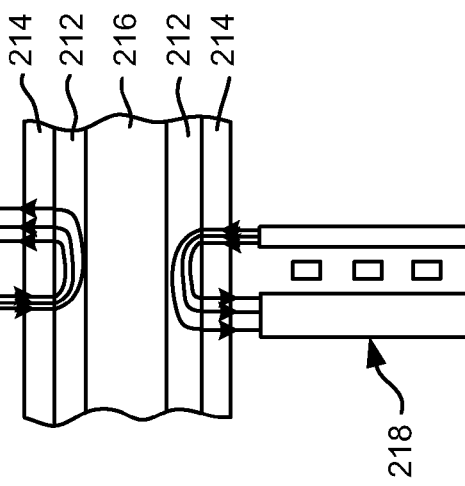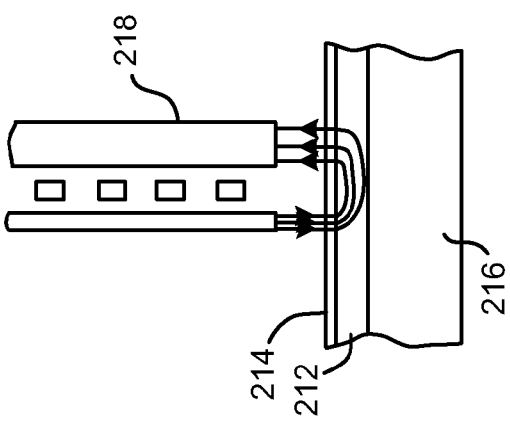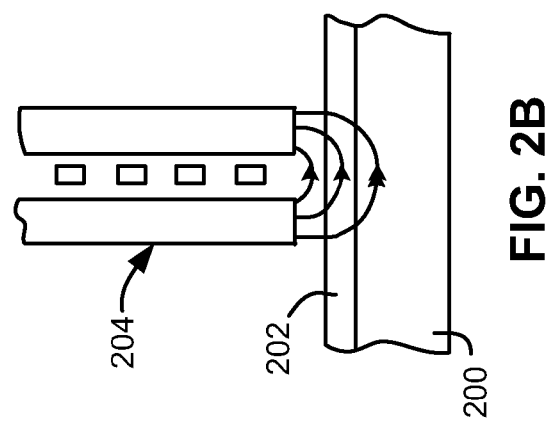

METHODS OF PRODUCTION FOR CORROSION-RESISTANT BIT PATTERNED MEDIA (BPM) AND DISCRETE TRACK MEDIA (DTM)

RELATED APPLICATIONS

This application is a divisional of U.S. patent application Ser. No. 13/466,970 filed May 8, 2012 now U.S. Pat. No. 8,717,710, which is herein incorporated by reference.

FIELD OF THE INVENTION

The present invention relates to discrete track and bit patterned media, and more particularly, this invention relates to discrete track and bit patterned media having reduced corrosion and controlling corrosion in producing discrete track and bit patterned media.

BACKGROUND

The development of discrete track media (DTM), in which adjacent recording tracks are separated by a groove or nonmagnetic body in order to suppress magnetic interference between tracks, and bit patterned media (BPM), in which adjacent recording bits are separated by a groove or nonmagnetic body in order to suppress magnetic interference between bits, has allowed for the realization of high density recording, where these technologies aid in the control of magnetic interference between adjacent magnetic data storage areas (tracks or bits).

There has been strong demand in recent years for greater volume in magnetic recording devices and for higher recording density, not only in domestic electronic appliances such as personal computers, but also other devices equipped with compact, large-capacity magnetic disk(s). In order to respond to this demand, there has been great effort put into developing magnetic heads and magnetic recording media. An increased areal recording density is desired for these devices, and efforts are being made to reduce the scale and to achieve even more dramatic increases in recording density.

Surface planarity is important in magnetic recording media in order to maintain flying stability of the magnetic head. Surface planarity is especially important in the case of DTM and BPM in which the areal recording density is high and the recording domain is small, such that the grooves between magnetic regions are filled by nonmagnetic material. In addition, with DTM and BPM, a protective film made of a carbon-based material is generally formed on the recording layer in order to protect the recording layer and to absorb lubricant, in the same way as with conventional recording media. Among carbon-based materials that may be used for the nonmagnetic material, one preferred material is diamond-like-carbon (DLC), which is amorphous, and therefore has excellent surface planarity, durability, and corrosion resistance.

Meanwhile, improvements in the reliability of DTM and BPM have brought to light the problems of corrosion caused by damage when the magnetic film is rendered uneven through dry etching or the like, and corrosion caused by extremely small defects and gaps between the magnetic region and nonmagnetic region of the recording layer. One example of a conventional technology for improving corrosion resistance involves a soft magnetic underlayer which is the primary cause of corrosion in perpendicular magnetic recording media. The corrosion resistance is improved by selecting a particularly resistant combination of the structure and material of the seed layer, which is the layer above the soft magnetic underlayer. In addition, there is another conventional method to inhibit corrosion of the magnetic region in DTM and BPM by forming a conductive film between the recording layer and the protective film.

However, if a protective film is formed as the layer above the magnetic region in order to inhibit corrosion thereof, the magnetic distance between the magnetic head and the magnetic recording medium increases and the magnetic recording characteristics deteriorate. On the other hand, if the protective film is made thinner in order to improve the magnetic characteristics, it is difficult to achieve results which satisfy the product performance from the point of view of corrosion resistance. Accordingly, with conventional technologies of preventing corrosion of the magnetic region of the magnetic recording layer, there are problems, such as problems in achieving both high magnetic recording characteristics and corrosion resistance at the same time.

SUMMARY

In one embodiment, a method for producing a magnetic recording medium includes forming a magnetic material layer above a substrate, transferring an uneven pattern to the magnetic material layer to form concave portions and convex portions, the convex portions being magnetic regions, depositing a nonmagnetic material above the concave portions to form nonmagnetic regions, forming an oxide layer and/or hydroxide layer above the magnetic regions of the recording layer, and forming an organic material layer which exhibits a corrosion-inhibiting characteristic with respect to cobalt or cobalt alloy above the oxide layer and/or hydroxide layer.

Any of these embodiments may be implemented in a magnetic data storage system such as a disk drive system, which may include a magnetic head, a drive mechanism for passing a magnetic storage medium (e.g., hard disk) over the head, and a control unit electrically coupled to the head for controlling operation of the head.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

DETAILED DESCRIPTION

Figure 1:
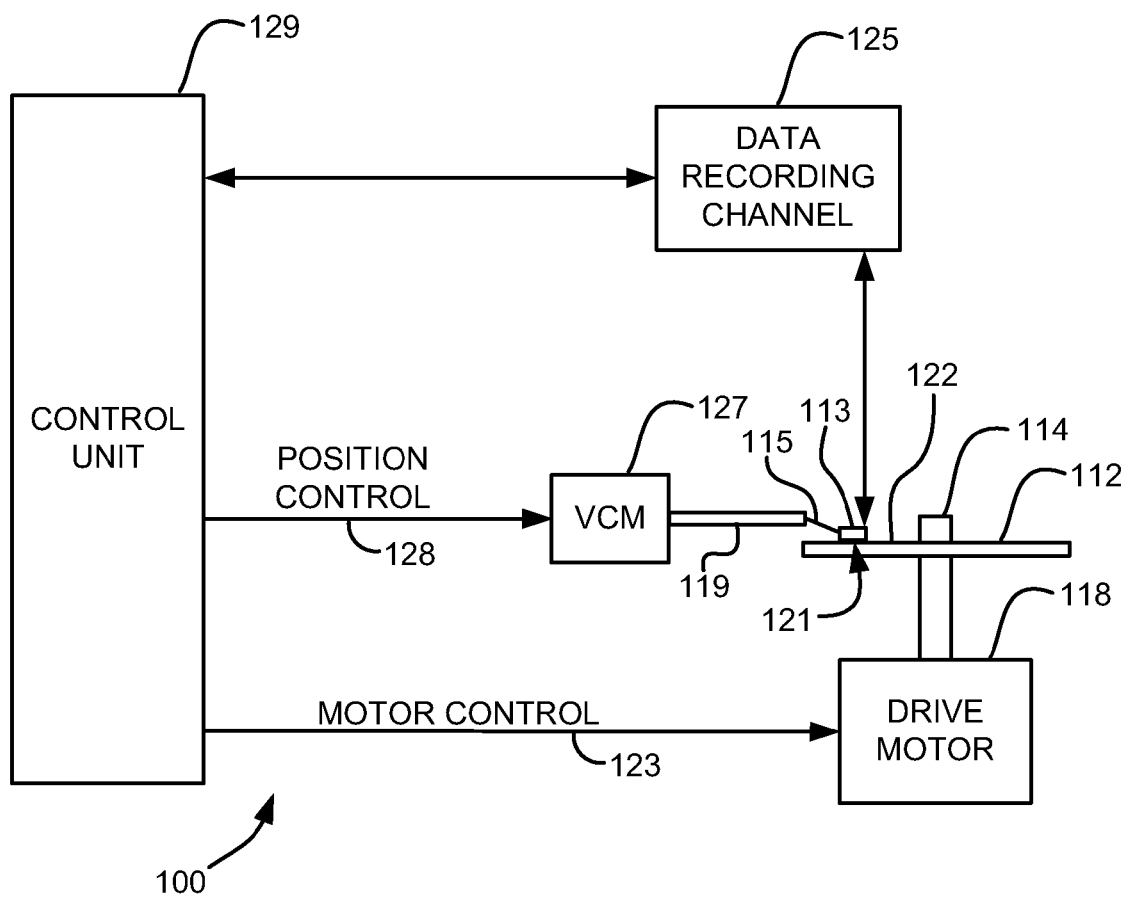
FIG. 1 is a simplified drawing of a magnetic recording disk drive system.
Figure 3B:
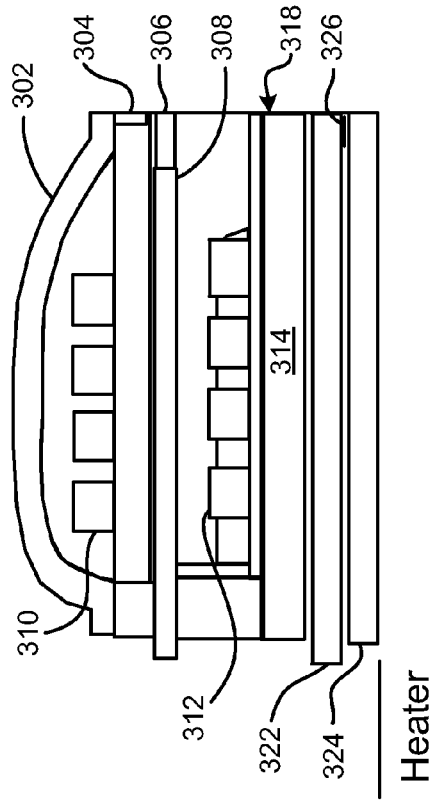
FIG. 3B is a cross-sectional view of one particular embodiment of a piggyback magnetic head with helical coils.
Figure 4B:
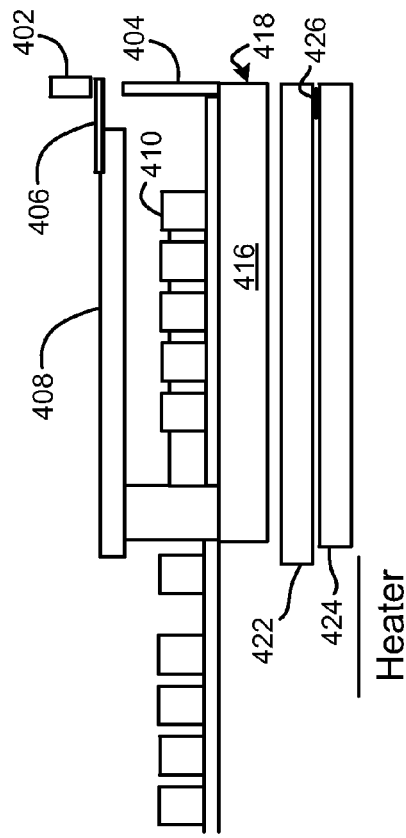
FIG. 4B is a cross-sectional view of one particular embodiment of a piggyback magnetic head with looped coils.
Figure 3A:
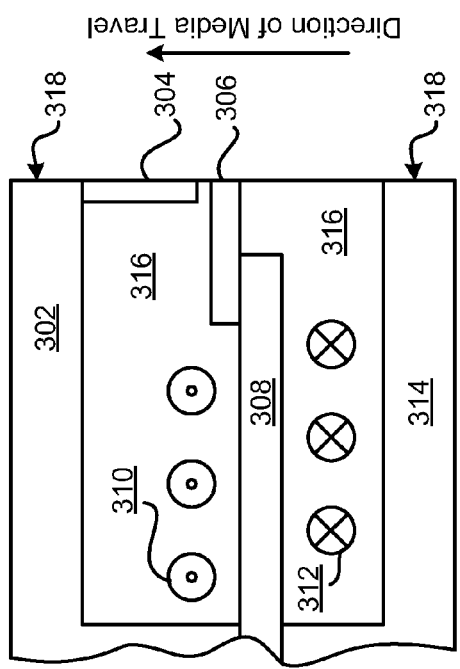
FIG. 3A is a cross-sectional view of one particular embodiment of a perpendicular magnetic head with helical coils.
Figure 4A:
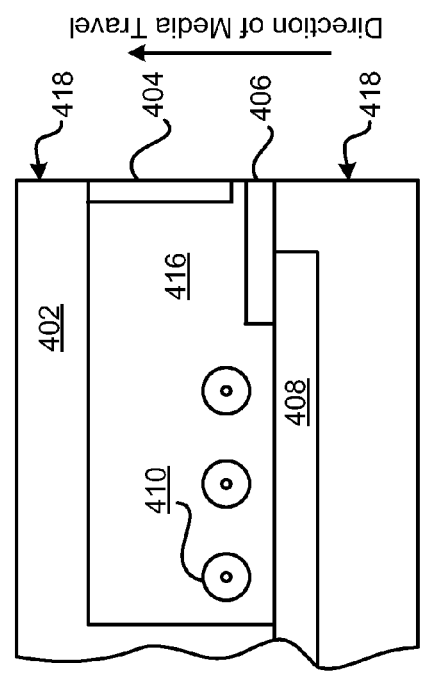
FIG. 4A is a cross-sectional view of one particular embodiment of a perpendicular magnetic head with looped coils.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a magnetic recording medium includes a magnetic recording layer including a magnetic material characterized by having convex and concave portions, the convex portions acting as magnetic regions, a nonmagnetic material positioned within each concave portion of the magnetic material which act as nonmagnetic regions that separate the magnetic regions, an organic material layer which exhibits a corrosion-inhibiting characteristic with respect to cobalt or cobalt alloy positioned on a nonmagnetic region side of each concave portion, and an oxide layer and/or hydroxide layer positioned adjacent the organic material layer on a magnetic region side of each concave portion of the magnetic material.

In another general embodiment, a magnetic recording medium includes a patterned recording layer, a protective film positioned above the patterned recording layer, an oxide layer and/or hydroxide layer positioned above a magnetic layer side of the patterned recording layer positioned at least in defect portions of the protective film, and an organic material layer which has a corrosion-inhibiting characteristic with respect to cobalt or cobalt alloy positioned above and in contact with an upper surface of the oxide layer and/or hydroxide layer.

In yet another general embodiment, a method for producing a magnetic recording medium includes forming a magnetic material layer above a substrate, transferring an uneven pattern to the magnetic material layer to form concave portions and convex portions, the convex portions being magnetic regions, depositing a nonmagnetic material above the concave portions to form nonmagnetic regions, forming an oxide layer and/or hydroxide layer above the magnetic regions of the recording layer, and forming an organic material layer which exhibits a corrosion-inhibiting characteristic with respect to cobalt or cobalt alloy above the oxide layer and/or hydroxide layer.

According to one embodiment, a discrete track medium (DTM) or a bit patterned medium (BPM), achieves excellent magnetic recording characteristics and corrosion resistance by having a corrosion-resistant layer at an interface of a magnetic region and a filler region of the magnetic recording layer, and by selecting a combination of the structure and material thereof.

In order to achieve the desired DTM or BPM having excellent corrosion resistance, a DTM or BPM includes a magnetic recording layer formed using an uneven pattern above a substrate, in which a magnetic region is formed on convex portions of the uneven pattern and a filler region is buried in concave portions of the uneven pattern. In addition, a layer including an organic material which exhibits a corrosion-inhibiting characteristic, such as cobalt or a cobalt alloy, and an oxide layer and/or hydroxide layer are formed at an interface of the magnetic region and the filler region. It has been found that the oxide layer and/or hydroxide layer is/are effective for stably holding a silane coupling agent on the metal surface of the magnetic region.

Cobalt and cobalt alloys not only have poor corrosion resistance, they also has very low potential in an aqueous solution environment, and therefore galvanic corrosion occurs readily between adjacent metals. In the case of a granular magnetic recording layer, Ru or a Ru alloy may be formed in a layer under the recording layer in order to promote segregation of the oxide at the crystal grain boundary in the recording layer. The Ru or Ru alloy has very high potential as it is a noble metal, so when areas of the concave portions which comprise the processed parts of the recording layer come into contact with the Ru or Ru alloy due to processing damage, galvanic corrosion of the Co alloy in the recording layer occurs, and this effect is more rapid than simple corrosion. Furthermore, in DTM and BPM, damage occurs when the magnetic film is rendered uneven, such as through dry etching or the like, and therefore there is a clear problem in that corrosion is accelerated at the interface of the magnetic region.

In view of this, a layer comprising an organic material which exhibits a corrosion-inhibiting characteristic with respect to cobalt or a cobalt alloy, and an oxide layer and/or hydroxide layer may be formed in the magnetic region of the processed part in the recording layer, in order to inhibit corrosion of the magnetic region, which comprises the processed part of the recording layer. Here, the characteristics of the organic material selected may include, from a corrosion point of view, 1) exhibiting a corrosion-inhibiting characteristic with respect to Co or a Co alloy; 2) comprising a film which has as few defects as possible, resulting in a smooth and accurate surface; and 3) having a structure which does not produce deterioration in the magnetic recording characteristics due to increased magnetic distance between the magnetic head and the magnetic recording medium, such as by being capable of being thin.

The corrosive environment is essentially an aqueous environment, but other factors include oxidation or alkalization brought about by lubricant decomposition, and contamination by chlorides, and therefore corrosion resistance covering a wide pH environment is preferred. However, the location where corrosion is a particular problem is at the interface between the magnetic region or layer and the nonmagnetic region or layer in the recording layer, and voids are believed to form in this region, so the environment is acidic when corrosion occurs in this area. With this assumption, it can be further assumed that corrosion resistance is particularly useful in the acidic region.

Regarding a corrosion-inhibiting characteristic with respect to Co or a Co alloy, as a result of various investigations, it was found that it is possible to inhibit Co or Co alloy corrosion by forming a heterocyclic organic compound layer, such as benzotriazole (BTA). It is believed that the corrosion resistance is improved because the heteroatoms in the heterocycles and cobalt in the recording layer are strongly bonded, and the BTA forms a network, in one approach.

Regarding a film which has as few defects as possible, in the case of a heterocyclic compound layer such as BTA, a thin film of Co oxide (such as a layer as thin as a few atoms) is invariably spontaneously formed on the surface of the Co or Co alloy, but BTA molecules form strong coordinate bonds with Co oxide, and BTA molecules also form covalent bonds between themselves, so a strong BTA polymer film is formed at the surface of the Co or Co alloy, and therefore an extremely refined film having excellent adhesion and no defects may be formed, in one approach.

Regarding a structure which does not produce deterioration in the magnetic recording characteristics due to increased magnetic distance between the magnetic head and the magnetic recording medium, a chemically passive metal or alloy thereof, or a carbon layer may be provided in a planar direction of the recording layer during the production process (in the region which is read/written by the head), as will be described later, after which it may be removed. This allows for the above problem to be resolved. Even if the film were to remain, a heterocyclic compound such as BTA may be used in the manner described above, and the film would be almost a single-molecule film, so it would be very thin and would not give rise to a deterioration in the magnetic recording characteristics.

In addition, in some approaches, regarding the organic material layer, the organic material film may be stably formed on the magnetic layer, and the magnetic layer may be unaffected by the formation of the organic material film.

Regarding stably forming the organic material film on the magnetic layer, it was found that the organic material layer is stably formed on an oxide film having a greater thickness than the spontaneous oxide film thickness. That is to say, for the oxide film and/or hydroxide film described herein, a layer comprising an organic material which exhibits a corrosion-inhibiting characteristic with respect to cobalt or cobalt alloy may be formed above or directly on the magnetic film. The magnetic film is metal, so a spontaneous oxide film is typically formed.

The thickness of this film is on the order of several tenths of a nanometer, but this thickness may be inadequate as being too thin, and better results may be obtained from a film having a thickness of at least 1.0 nm. Because of this, an oxidant may also be present and an oxide and/or hydroxide layer formed when the organic material layer is formed may be used, or an oxide and/or hydroxide layer may be formed before the organic material layer is formed.

Regarding the magnetic layer being unaffected by the formation of the organic material film, suitably selecting conditions under which the oxide film is formed may provide this result.

Consequently, corrosion resistance may be improved in a DTM and/or a BPM by forming a layer comprising an organic material which exhibits a corrosion-inhibiting characteristic with respect to cobalt or cobalt alloy, and an oxide layer and/or a hydroxide layer at the interface of the magnetic region and the filler region in the magnetic recording layer.

Figure 5A:
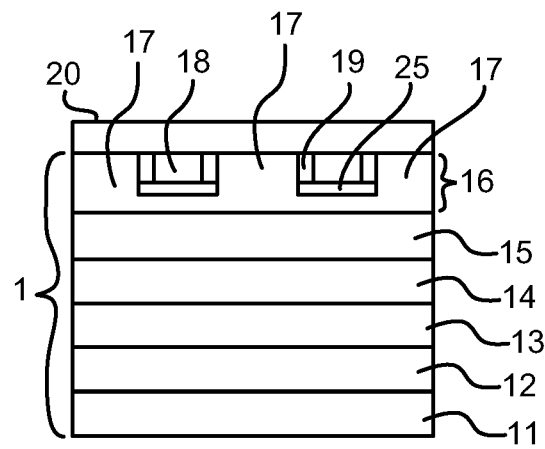
FIGS. 5A-5B schematically show cross-sectional structures of a magnetic recording medium according to an exemplary embodiment.

Now referring to FIG. 5A, a cross-sectional view of a structure of a magnetic disk 1 in a basic patterned medium is shown according to one embodiment. A glass disk substrate 11 may be used for the substrate, or any other suitable substrate material known in the art. The magnetic disk 1 also comprises, according to one embodiment, an adhesion layer 12, a soft magnetic underlayer 13, a seed layer 14, an interlayer 15, and a recording layer 16 which are formed above the substrate 11. The recording layer 16 is formed with an uneven upper surface which provides the recording layer 16 with unevenness, with convex portions forming magnetic regions 17, and concave portions after being filled with a nonmagnetic material, forming nonmagnetic regions 18. A protective film B layer 25 may be formed at a bottom of the concave portions.

Figure 5B:
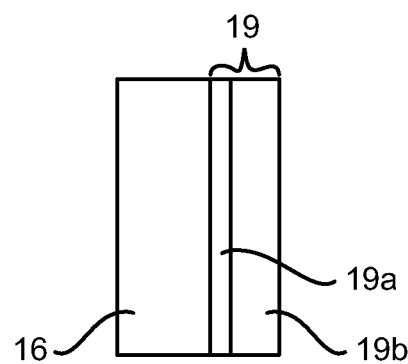

As shown in FIG. 5B, which is a detailed view of an interface between the magnetic region 17 and the nonmagnetic region 18 as shown in FIG. 5A, layer 19 comprises an organic material layer 19a which exhibits a corrosion-inhibiting characteristic with respect to cobalt or cobalt alloy, and an oxide and/or hydroxide layer 19b, which is formed on an interior of the organic material layer 19a with respect to the recording layer 16 concave portions. The organic material layer 19a and the oxide and/or hydroxide layer 19b may be formed at an interface between the magnetic region 17 and the nonmagnetic region 18.

Referring again to FIG. 5A, according to one embodiment, a protective film A 20 may be formed above or directly on the recording layer 16. Also, in some approaches, a lubricant (not shown) may be coated on the recording layer 16.

There is no particular limitation as to the material which may be used for the adhesion layer 12 provided that it exhibits excellent adhesion to the substrate 11 and surface planarity, but it may preferably be an alloy comprising at least two metals chosen from Ni, Al, Ti, Ta, Cr, Zr, Co, Hf, Si, and B. More specifically, NiTa, AlTi, AlTa, CrTi, CoTi, NiTaZr, NiCrZr, CrTiAl, CrTiTa, CoTiNi, or CoTiAl may be used, among other possibilities known in the art.

There is no particular limitation as to the material of the soft magnetic underlayer 13 provided that saturation magnetic flux density (Bs) of this layer is at least about 1.0 Tesla, uniaxial anisotropy is imparted in the radial direction of the disk substrate 11, coercive force measured in the head travel direction is no greater than 1.6 k/A/m, and surface planarity is excellent. Specifically, the abovementioned characteristics are readily achieved if an amorphous alloy is used, such as one comprising Co, Ni, or Fe as a main component (50 at % or greater), to which Ta, Hf, Nb, Zr, Si, B, C or the like is added. In addition, it is possible to reduce the noise by adopting a laminated structure in which a nonmagnetic layer is inserted into the soft magnetic underlayer 13, in one approach. CoCr alloy, Ru, Cr or Cu, and MgO, etc., may preferably be used for this nonmagnetic layer.

The role of the seed layer 14 is to control the orientation and crystal grain size of the interlayer 15, and it is possible to use an fcc alloy comprising Ni as a main component. Typical materials which may be used include alloys comprising at least one element selected from W, Fe, Ta, Ti, Ta, Nb, Cr, Mo, V, Cu and the like, with Ni. Furthermore, in order to improve the corrosion resistance, the seed layer 14 may have a two-layer structure in which the abovementioned seed layer serves as a recording layer-side seed layer (second seed layer), and an alloy in which Ta, Ti, Nb, and/or Al is added to Cr is inserted between the second seed layer and the soft magnetic underlayer 13 as a first seed layer. Ru alone, or an alloy having a hexagonal close-packed (hcp) structure or fcc structure comprising Ru as a main component may be used as the interlayer 15. A CoCr alloy such as CoCrPt alloy, or an alloy having a granular structure comprising FePt alloy as a main component to which an oxide, such as $SiO_2$ is added, specifically CoCrPt—$SiO_2$, CoCrPt—MgO, CoCrPt—TaO, or the like, may be used as the magnetic layer material 17 which is formed on the convex portions of the recording layer 16. Furthermore, an oxide such as $SiO_2$, $Al_2O_3$, $TiO_2$, ferrite, a nitride such as AlN, and/or a carbide such as SiC, may be used as the nonmagnetic material 18 which is formed in the concave portions of the recording layer 16. For the Co and Pt concentrations, the Cr concentration may preferably be from about 15 at % to about 25 at %, and the Cr concentration may preferably be from about 10 at % to about 20 at %. Of course, other ranges are also possible, as would be known to one of skill in the art upon reading the present descriptions.

The protective film B 25 which is positioned at a bottom of the magnetic material 17 is a layer which is introduced with the aim of correcting defects caused by damage sustained during the magnetic layer processing, if any (which there typically is), and it comprises a chemically passive metal or alloy thereof, a carbon layer, or some other suitable material. Cr, Ti, Ni, Mo, Nb, W, Ta, Zr or an alloy comprising at least one of these may be used as the chemically passive metal, in some approaches. An alloy comprising Cr may be preferred in one approach.

The organic material layer 19a which is positioned at the interface of the magnetic layer 17 and the nonmagnetic layer 18 should, in preferred embodiments, exhibit a corrosion-inhibiting characteristic with respect to cobalt or cobalt alloy. A heterocyclic compound such as BTA is especially effective as the organic material layer, but is not so limited. Heterocyclic compounds are compounds comprising heterocycles which include heteroatoms which are preferably nitrogen atoms, sulfur atoms, oxygen atoms, selenium atoms, tellurium atoms, phosphorus atoms, boron atoms, etc., with nitrogen atoms, sulfur atoms, and oxygen atoms being most preferred. There is no limit to the number of heteroatoms included in the heterocyclic compound, but two or more heteroatoms produces a strong anti-corrosion characteristic. Specific heterocycles include benzotriazole rings, benzothiazole rings, benzimidazole rings, triazole rings, imidazole rings, pyridine rings, quinoline rings, etc. In addition to the above listed structures, there are also thiadiazole rings. However, this does not imply any limitation. Substituent groups may also be present, such as alkyl groups, sulfo groups, carboxyl groups, etc. Specifically, benzotriazole; 1,2,3-triazole; 1,2,3,4-tetrazole; 3-amino-1,2,4-triazole; nitro-1H-benzotriazole; carboxy benzotriazole; 5-methyl-benzotriazole; uric acid, etc., may be used, but this does not imply any limitation to what may be used.

In one embodiment, a magnetic recording medium comprises a magnetic recording layer comprising a magnetic material characterized by having convex and concave portions, the convex portions acting as magnetic regions, a nonmagnetic material positioned within each concave portion of the magnetic material which act as nonmagnetic regions that separate the magnetic regions, an organic material layer which exhibits a corrosion-inhibiting characteristic with respect to cobalt or cobalt alloy positioned on a nonmagnetic region side of each concave portion, and an oxide layer and/or hydroxide layer positioned adjacent the organic material layer on a magnetic region side of each concave portion of the magnetic material.

Furthermore, in one approach, the organic material layer and the oxide layer and/or hydroxide layer may be only positioned on side walls of each concave portion of the magnetic material, or in an alternate approach, on side walls and a bottom surface of each concave portion of the magnetic material.

In more approaches, the magnetic regions may be in contact with and/or bonded with the oxide layer and/or hydroxide layer, the medium may further comprise an interlayer positioned below the recording layer, a seed layer positioned below the interlayer, and an adhesion layer positioned below the seed layer, and/or the oxide layer and/or hydroxide layer may have a thickness of at least about 1 nm.

In addition, any magnetic recording medium described herein may be included in a magnetic data storage system. The magnetic data storage system may include at least one magnetic head, a magnetic recording medium as described herein according to any of various embodiments, a drive mechanism for passing the magnetic medium over the at least one magnetic head, and a controller electrically coupled to the at least one magnetic head for controlling operation of the at least one magnetic head.

In another embodiment, a magnetic recording medium comprises a patterned recording layer, a protective film positioned above the patterned recording layer, an oxide layer and/or hydroxide layer positioned above a magnetic layer side of the patterned recording layer positioned at least in defect portions of the protective film, and an organic material layer which has a corrosion-inhibiting characteristic with respect to cobalt or cobalt alloy positioned above and in contact with an upper surface of the oxide layer and/or hydroxide layer.

A method for forming the organic material layer 19a using a heterocyclic compound, in one embodiment, may be carried out by immersing the magnetic recording medium in an aqueous solution or organic solvent including at least one of the abovementioned heterocycles for a predetermined time, or by spraying the same. Furthermore, a compound containing N or S and O which is not heterocyclic but has unpaired electrons having an attraction effect, such as amine, is also effective. As mentioned above, an oxide layer and/or hydroxide layer may be formed on the magnetic layer 17 in order to form the organic material layer 19a directly on the magnetic layer 17, in one approach.

Immersing the disk in an aqueous solution having the organic material (wet method) is a suitable method for forming the organic material layer 19a, in one approach, and a method in which the disk is exposed on an organic solid inside a sealed vessel is also effective as another method (dry method), according to one approach.

The method for forming the oxide layer and/or hydroxide layer 19b on the magnetic layer 17 may be a method in which an oxidant is also present when the organic material layer 19a is formed, or a method involving heating in air. Oxidants which may be used include: hydrogen peroxide, chloric acid, perchloric acid, persulfuric acid, nitric acid, and salts thereof, and ceric ammonium nitrate, etc. When the treatment is carried out by the wet method, it is also effective to add a surfactant in order to raise the permeability of the solution in one approach. Surfactants which may be used include: anionic surfactants such as dodecyl sulfate, stearic acid, and toluenesulfonate; cationic surfactants such as cetyltrimethyl ammonium salt and tetramethylammonium hydroxide; amphoteric surfactants such as lauryl betaine; and/or nonionic surfactants such as polyethylene glycol and polyvinyl alcohol.

The material used for the protective film A 20 which is formed on the recording layer 16 may comprise a hard carbon film, such as diamond-like-carbon (DLC), for example. A lubrication layer may further be positioned on the protective film 20, although this is not shown in FIG. 5A. Perfluoropolyether (PFPE) or a Fomblin-based lubricant may be used for the lubrication layer, in some approaches.

Figure 6A:
FIGS. 6A-6L show steps in a method for producing a magnetic recording medium according to an exemplary embodiment.

A method for producing the abovementioned magnetic recording medium is now described with reference to FIGS. 6A-6L. The magnetic recording medium may be produced using a sputtering apparatus. In a first operation, as shown in FIG. 6A, a glass substrate of diameter 63.5 mm may be used for the substrate 11. An adhesion layer 12, soft magnetic underlayer 13, seed layer 14, interlayer 15, and a recording layer (magnetic region) 17 may be formed in succession via sputtering or some other deposition technique. A composition and thickness of each layer may be as shown in Table 1, according to one exemplary embodiment. The compositions and thicknesses shown in Table 1 are merely examples, and the same effects may still be achieved if other compositions and thicknesses are used, as would be understood by one of skill in the art. For example, the same effects may still be achieved if $Cr_{50}Ti_{50}$ is used for the first seed layer and $Ni_{90}Ti_{10}$ is used for the second seed layer. Also, if NiWTa is used for the seed layer 14, without having a double seed layer; or if CoCrPt—TaO is used in the recording layer 17.

TABLE 1

| | | Target Composition (at %) | Film Thickness (nm) |
|---|---|---|---|
| | Adhesion Layer | $Ni_{63}Ta_{37}$ | 10 |
| Soft Magnetic Underlayer | First Soft Magnetic Layer | $Co_{92}Ta_3Zr_5$ | 50 |
| | Second Soft Magnetic Layer | Ru | 0.8 |
| | Third Soft Magnetic Layer | $Ta_{70}Cr_{30}$ | 50 |
| Seed Layer | First Seed Layer | $Ta_{70}Cr_{30}$ | 2 |
| | Second Seed Layer | $Ni_{92}W_8$ | 5 |
| | Interlayer | Ru | 16 |
| | Recording Layer | $CoCrPt—SiO_2$ | 16 |

Figure 6D:
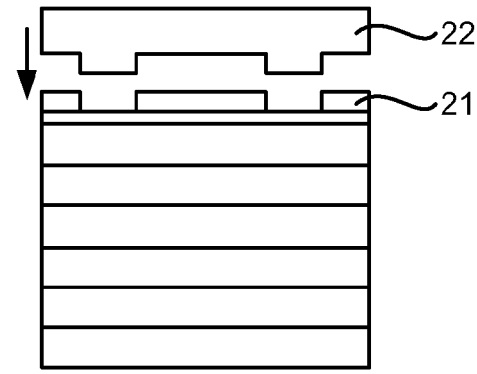
Figure 6B:
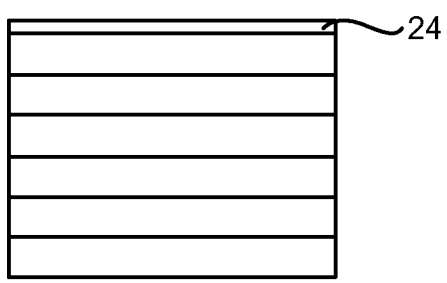
Figure 6E:
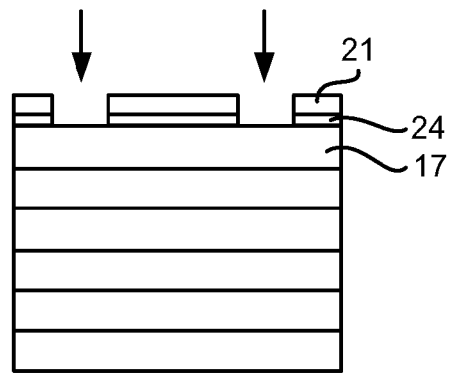
Figure 6C:
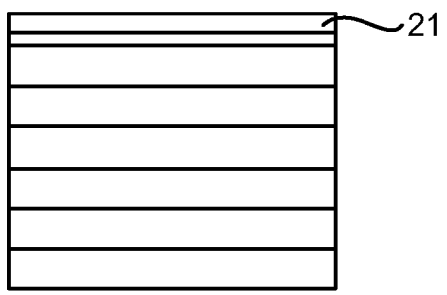

Next, as shown in FIGS. 6B-6C according to one embodiment, a protective film C 24 may be formed on the magnetic region 17 of the recording layer, after which a resist 21 may be coated on the protective film C, such as via spin-coating or some other suitable method. A positive resist may be used as a material for the resist layer, for example. The protective film C 24 may be formed in order to prevent corrosion of the recording layer (magnetic region) 17 in the step of forming discrete tracks by application of the resist 21.

Figure 6F:
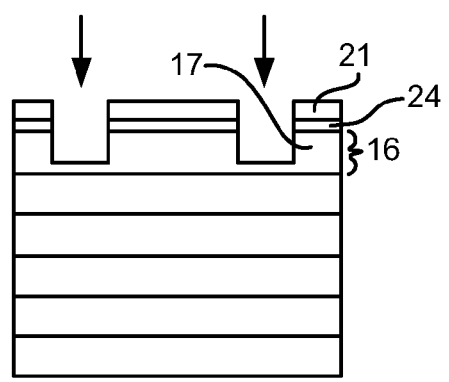

Next, as shown in FIG. 6D according to one embodiment, an uneven pattern having predetermined gaps corresponding to a servo pattern in a servo region and a track pattern in a data region may be transferred to the resist layer, such as via a nanoimprint process using a transfer device 22, or some other method. As shown in FIG. 6E according to one embodiment, the protective layer C 24 in the resist removal part may then be removed via reactive ion beam etching or some other method. As shown in FIG. 6F, in one approach, part of the magnetic region 17 of the recording layer may be further removed using ion milling or some other method, in order to form the concave portions.

Figure 7A:
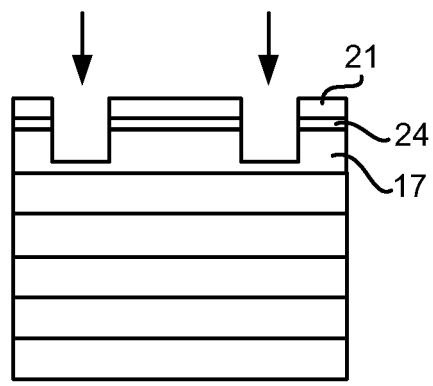
FIGS. 7A-7B schematically show a cross-sectional structure of a magnetic recording medium according to an exemplary embodiment.

Here, as shown in FIG. 7A, there is no problem even if the removed layer reaches the interlayer below the recording layer.

Figure 6G:
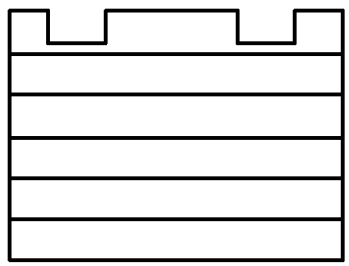
Figure 6J:
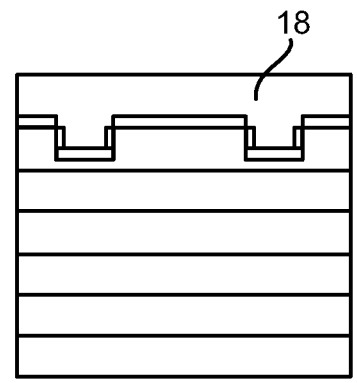
Figure 6H:
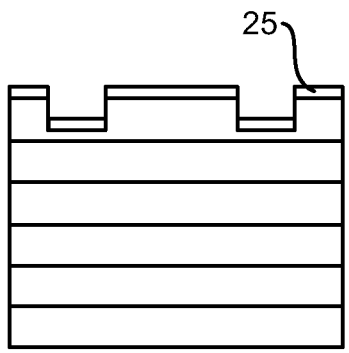
Figure 6K:
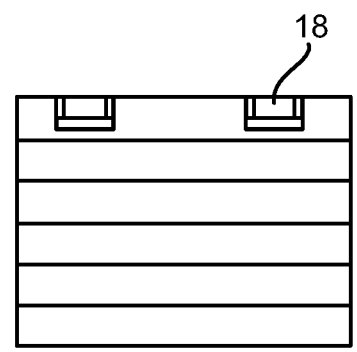
Figure 6I:
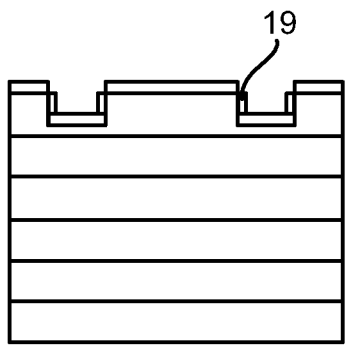

Next, referring to FIG. 6G in one approach, the protective film and the resist layer are removed, after which the protective film B 25 is formed such as via sputtering using a carbon film or chemically passive metal, or some other method, as shown in FIG. 6H. Next, as shown in FIG. 6I, in one approach, an organic material layer 19a and an oxide layer and/or hydroxide layer 19b may be formed in a film thickness direction of the region where the carbon film or chemically passive metal in the concave portions of the magnetic region of the recording layer has not been fully formed, in one approach. In this case, the carbon film or chemically passive metal layer is partially formed in the film thickness direction, although this is not shown in the figure.

Next, as shown in FIG. 6J in one approach, the concave portions in the surface of the unprocessed element may be filled with a nonmagnetic material 18 to a slightly greater depth than the thickness of the concave portions, such as by using sputtering or some other method. Next, as shown in FIG. 6K, the excess filler layer 18 (nonmagnetic region) and protective film B 25 (the upper portion of the magnetic region of the recording layer) may be removed using etching, such as chemical-mechanical planarization (CMP), or some other method, and the concave portions on the surface of the medium formed in the steps shown in FIGS. 6D-6J may be planarized.

Figure 6L:
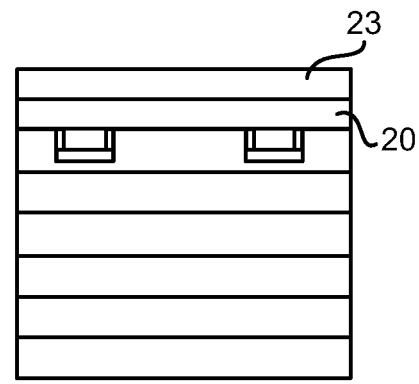

Then, as shown in FIG. 6L in one approach, the protective layer A 20 may be deposited using chemical vapor deposition (CVD) or some other method on the planarized surface, after which a liquid lubrication layer 23 may be coated on the protective film A 20, in one approach. As a result of the method shown in FIGS. 6A-6L, the recording medium shown in FIG. 5A may be obtained.

For the corrosion resistance test, disks on which various kinds of lubricants were formed to around 1.0 nm were left to stand for 72 hours under high-temperature, high-humidity conditions of temperature of about 65° C. and relative humidity of about 95% RH, after which 3 ml of a mixed solution of 3% nitric acid and 3% hydrogen peroxide was dripped on the surface of the disk, which was then left to stand for a further 1 hour at room temperature (25° C.), after which the solution was collected, and the cobalt (Co) concentration was measured using inductively coupled plasma-mass spectrometry (ICP-MS). A Co concentration of 10 μ/L was taken as A, 10-50 μ/L was taken as B, 50-100 μL was taken as C, and 100 μ/L a was taken as D. A rank of B or above may be preferred in practice. Specific exemplary embodiments in which the approaches, systems, and methods described herein are applied are now described with reference to the tables and figures.

In any embodiments, it is possible to obtain a magnetic recording device having a recording density of 95 gigabits per square inch by constructing a magnetic recording device using: a magnetic recording medium as described herein, a mechanism for driving the magnetic recording medium in the recording direction, a magnetic head provided with a recording portion and a reproduction portion, and a signal processing mechanism for carrying out waveform processing of input signals and output signals with respect to the magnetic head.

In a first exemplary embodiment, the layer structure shown in FIG. 5A and Table 1 was used. Carbon was used in the protective film B, and the film was formed to 2 nm. The filler used was $SiO_2$. A disk as shown in FIG. 5H was immersed for 30 minutes in an aqueous solution containing 1 wt % benzotriazole and 10% of 30% $H_2O_2$, and a benzotriazole layer and an oxide layer and/or hydroxide layer were produced in the position of the vertical portions of the concave portions of the magnetic region of the recording layer, as shown in FIG. 6I. Also, the corrosion resistance and medium signal-to-noise ratio (SNR) of this medium (sample 1-1) were tested, and it was possible to achieve high SNR of 18 dB or more, and excellent corrosion resistance achieving rank A.

In a first comparative example, the layer structure shown in FIG. 5A and Table 1 was used. Carbon was used in the protective film B, and the film was formed to 2 nm. The filler used was $SiO_2$. A disk as shown in FIG. 5H was immersed for 30 minutes in a solution of 1 wt % benzotriazole, and a benzotriazole layer and an oxide layer and/or hydroxide layer were produced in the position of the vertical portions of the concave portions of the magnetic region of the recording layer, as shown in FIG. 6I. Also, the corrosion resistance and medium SNR of this medium (sample 1-2) were investigated, and even though it was possible to achieve a high SNR of 18 dB or more, the corrosion resistance achieved rank C which was far worse than in the case of sample 1-1.

In a second exemplary embodiment, a sample with a different type of heterocyclic compound for forming the organic material layer formed in the position of the vertical portions of the concave portions of the magnetic region of the recording layer was then produced, and the results of evaluating the medium SNR and corrosion resistance in the same way as in sample 1-1 are shown in Table 2. The concentration of the heterocyclic compound in the aqueous solution in which the medium was immersed was 1.0 wt %, and, where there was not complete dissolution, the compound was first of all dissolved in an organic solvent such as ethanol, after which it was mixed with the aqueous solution. 2-10 is an exemplary embodiment which does not employ a heterocyclic compound, but makes effective use of a compound having unpaired electrons. 10% of 30% hydrogen peroxide oxidant was added to all of the solutions.

TABLE 2

| Sample | Heterocyclic Compound for Forming the Organic Layer in the Corrosion-Resistance Magnetic Region/Filler Region | Corrosion-Resistance Rank |
|---|---|---|
| 2-1 | no treatment | D |
| 2-2 | benzotriazole | A |
| 2-3 | 1,2,3-triazole | A |
| 2-4 | nitro-1H-benzotriazole | A |
| 2-5 | methyl-benzotriazole | A |
| 2-6 | carboxy benzotriazole | A |
| 2-7 | uric acid | A |
| 2-8 | pterin | A |
| 2-9 | phenyl-1,3,4-thiadiazole-2-triol | A |
| 2-10 | mercaptobenzothiazole | A |
| 2-11 | ethylenediamine | A |

All of the samples exhibited excellent corrosion resistance. Furthermore, the SNR was also good at 18 dB or more. It is clear that the metals had excellent adhesion with the $CoCrPt$—$SiO_2$ used for the recording layer, because of the excellent corrosion resistance.

In a third exemplary embodiment, the method involved splitting the step of forming the oxide and/or hydroxide and the step of forming the organic material layer, in the step for forming the oxide layer and/or hydroxide layer and the organic material layer on the disk in the state shown in FIG. 5H. That is to say, a disk in the state shown in FIG. 5H was exposed for 2 hour to an atmosphere at 120° C. in order to form the oxide and/or hydroxide on the magnetic layer. After this, the disk was immersed for 30 minutes in an aqueous solution containing 1 wt % benzotriazole, and a benzotriazole layer and an oxide layer and/or hydroxide layer were produced in the position of the vertical portions of the concave portions of the magnetic region of the recording layer, as shown in FIG. 5I. The subsequent steps were the same as in the first exemplary embodiment. When the corrosion resistance and medium SNR of this medium (sample 3-1) were investigated, it was possible to achieve high a SNR of 18 dB or more, and excellent corrosion resistance achieving rank A.

In a fourth exemplary embodiment, a sample was produced using materials other than hydrogen peroxide as the oxidant used in the first exemplary embodiment, and the results of evaluating the medium SNR and corrosion resistance in the same way as in the first exemplary embodiment are shown in Table 3. All of the samples exhibited excellent corrosion resistance. Furthermore, the SNR was also good at 18 dB or more. It is clear that the metals had excellent adhesion with the $CoCrPt$—$SiO_2$ used for the recording layer, because of the excellent corrosion resistance.

TABLE 3

| Sample | Oxidant | Concentration | Corrosion-Resistance Rank |
|---|---|---|---|
| 4-1 | sodium perchlorate | 1.0 wt % | A |
| 4-2 | sodium perchlorate | 0.02 wt % | A |
| 4-3 | ceric ammonium nitrate | 0.005 wt % | A |
| 4-4 | sodium chlorate | 0.05 wt % | A |

In a fifth exemplary embodiment, the corrosion resistance was evaluated after using a chemically passive metal instead of the carbon which was used for the protective film B employed in the first exemplary embodiment. In all cases, when the medium SNR and corrosion resistance in FIG. 5L were ultimately investigated, it was possible to achieve high SNR of 18 dB or more, and excellent corrosion resistance of rank A.

TABLE 4

| Sample | Material of Protective Film B (Chemically Passive Metal) | Corrosion-Resistance Rank |
|---|---|---|
| 5-1 | $Ta_{70}Cr_{30}$ | A |
| 5-2 | $Cr_{70}Nb_{30}$ | A |
| 5-3 | $Cr_{50}Zr_{50}$ | A |
| 5-4 | $Cr_{50}Ti_{45}Nb_5$ | A |
| 5-5 | $Cr_{50}Ti_{50}$ | A |

In a sixth exemplary embodiment, the procedure shown in FIGS. 8A-8K is different than the production method shown in FIGS. 6A-6L. The steps shown in FIGS. 8A-8F are similar to the steps shown in FIGS. 6A-6F. In the step shown in FIG. 8G, the protective film C was left, rather than being removed as far as the protective film C in the step in FIG. 6G. In this state, the organic material layer and the oxide layer and/or hydroxide layer were formed as in FIG. 8H. The subsequent steps are similar as to those shown in FIGS. 6I-6L. When the sample was produced using this step, there was a difference between when the carbon or chemically passive metal layer was, or was not, present in the bottom parts of the concave portions of the magnetic region in the recording layer, as is clear from comparing FIG. 8K and FIG. 6L. A corrosion-resistance rank of B was obtained for the sample in FIG. 8K produced by the above method. The corrosion resistance was slightly worse than when the carbon layer was present in the bottom parts of the concave portions in exemplary embodiment. This is believed to be because defects are produced by the damage caused by processing of the concave portions of the recording layer, and paths are partially formed with the Ru of the underlying interlayer.

Figure 7B:
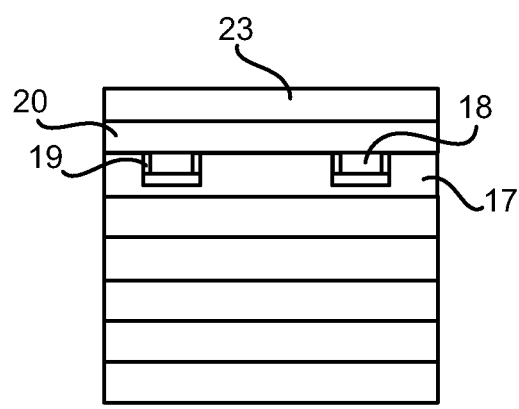
Figure 8A:
FIGS. 8A-8K show steps in a method for producing a magnetic recording medium according to an exemplary embodiment.
Figure 8B:
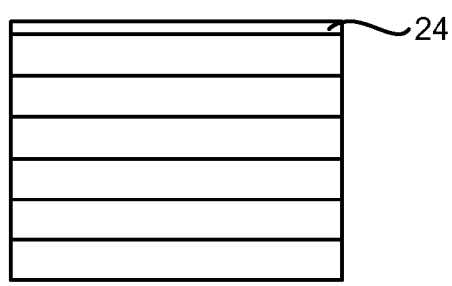
Figure 8C:
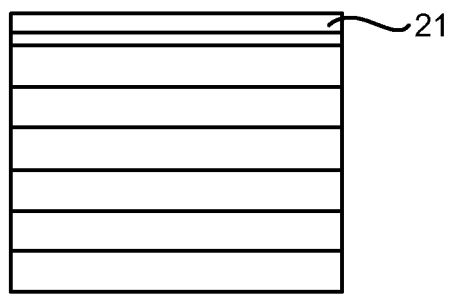
Figure 8D:
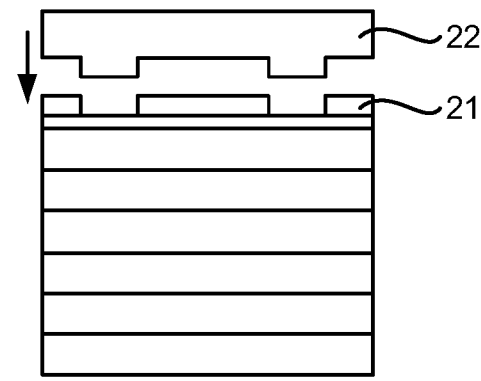
Figure 8E:
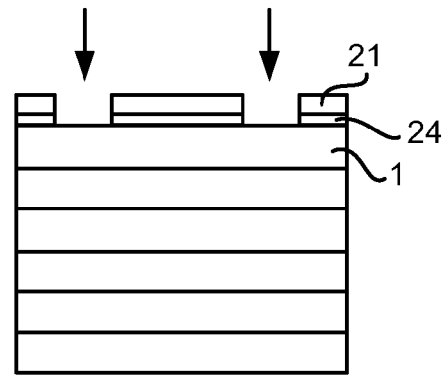
Figure 8F:
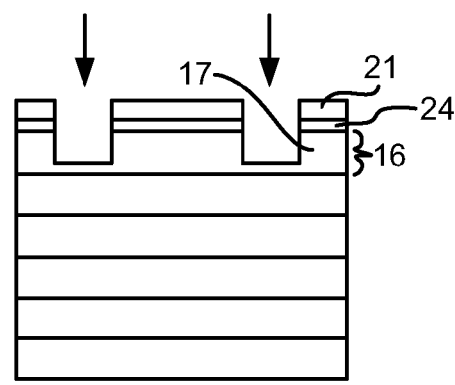
Figure 8G:
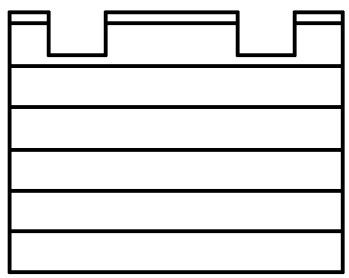
Figure 8J:
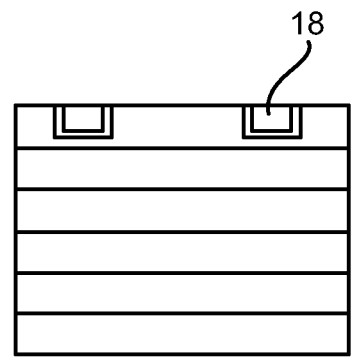
Figure 8H:
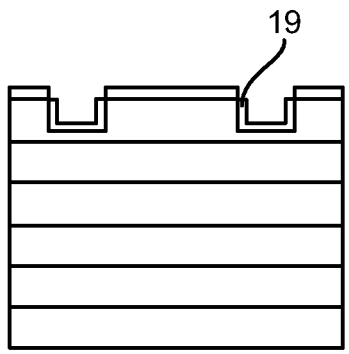
Figure 8K:
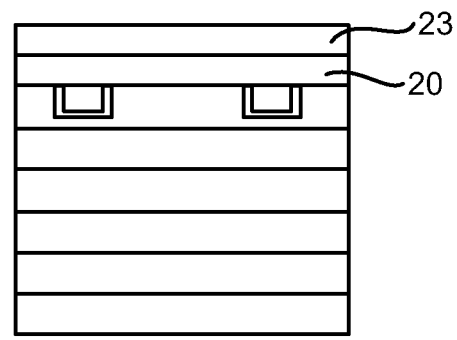
Figure 8I:
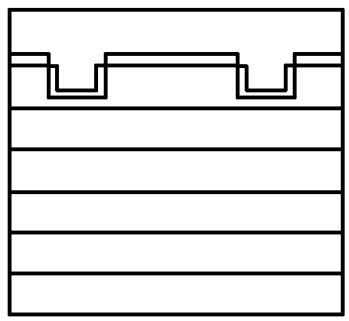

In a seventh exemplary embodiment, as shown in FIG. 7A, in a step for forming the unevenness in the magnetic region of the recording layer, the recording layer at the bottom portions of the concave portions was completely removed, and the interlayer was exposed, after which production was carried out in the following order: formation of the protective film B, formation of the organic material layer and the oxide and/or hydroxide layer, formation of the filler layer, removal of the filler layer and protective film B (upper surface) (CMP), formation of the protective film A, and possible application of lubricant (as shown in FIG. 7B, sample 7-1). The material of the recording layer and film thickness were similar as to in sample 1-1. When the corrosion resistance and medium SNR of this medium (sample 7-1) were investigated, it was possible to achieve high SNR of 18 dB or more, and excellent corrosion resistance of rank A.

In an eighth exemplary embodiment, when the sample was produced under the conditions of exemplary embodiment 1, the results were obtained from investigating the change in corrosion resistance when the time for which the sample was immersed in 10 wt % benzotriazole and 10% of a 30% $H_2O_2$ solution was varied, and the thickness of the oxide and/or hydroxide layer was varied. When the thickness of the oxide and/or hydroxide layer was 1.0 nm or greater, a rank of B or greater was obtained and the corrosion resistance improved.

TABLE 5

| Sample | Treatment Time (min) | Thickness of Oxide and/ or Hydroxide Layer (nm) | Corrosion-Resistance Rank |
|---|---|---|---|
| 8-1 | 0 | 0.5 | D |
| 8-2 | 1 | 0.8 | C |
| 8-3 | 5 | 1.0 | B |
| 8-4 | 10 | 1.2 | A |
| 8-5 | 30 | 1.5 | A |

Figure 9:
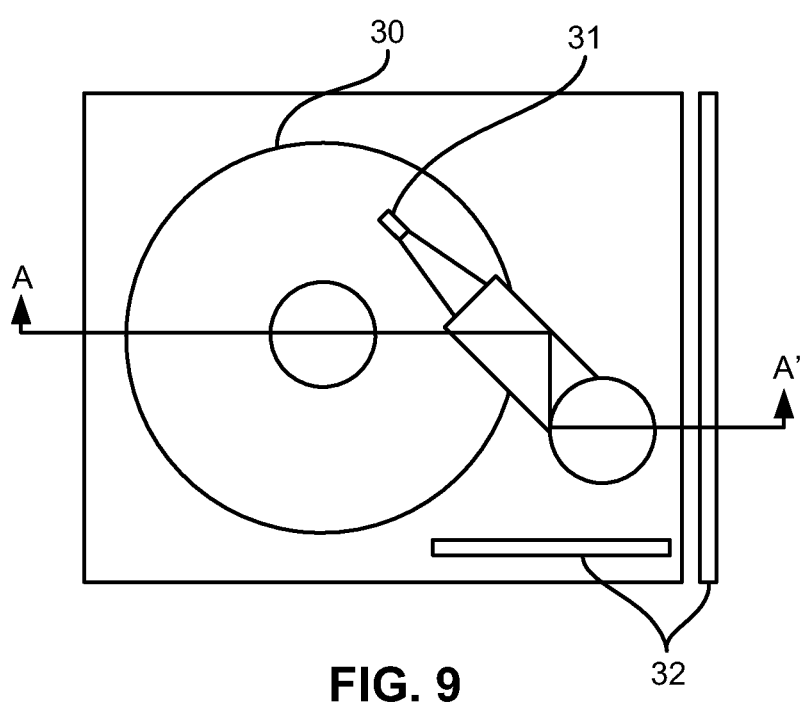
FIG. 9 is a schematic view from above of a magnetic recording device according to an exemplary embodiment.
Figure 10:
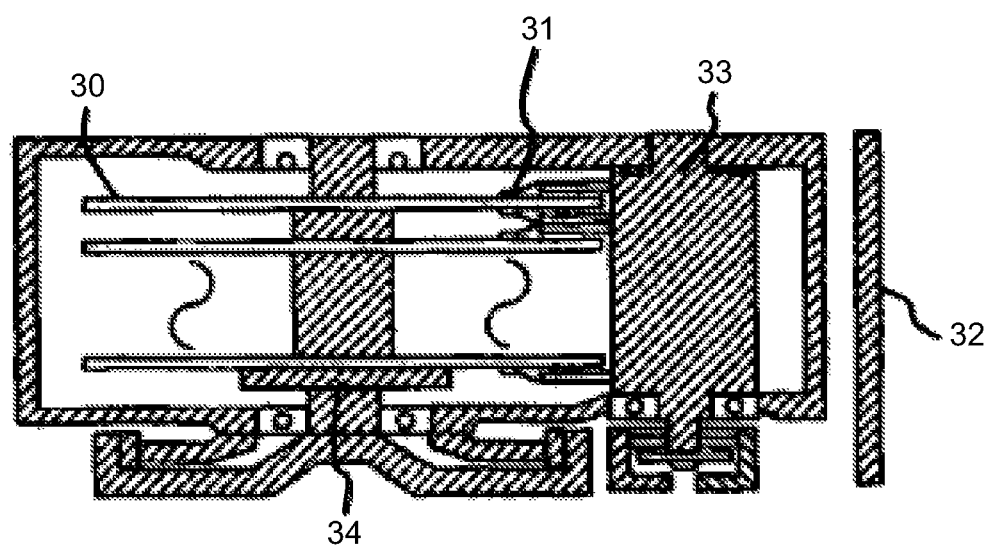
FIG. 10 is a cross-sectional view of a magnetic recording device according to an exemplary embodiment.

FIG. 9 schematically shows a magnetic recording device in which various types of media described in embodiments described herein may be applied. Furthermore, FIG. 10 is a cross-sectional view along line A-A' in FIG. 9. This device has a structure in which the following are provided inside an enclosure: the patterned medium described in embodiments herein; a drive mechanism for rotating the medium; a magnetic head comprising a recording part/reproduction part; a drive mechanism for operating the magnetic head relative to the patterned medium; and a recording and production mechanism for reproducing input signals from the magnetic head and output signals from the magnetic head. The magnetic head may be a composite head comprising a trailing shield head-type recording head, and a reproduction head employing a shield-type MR reproduction element (GMR film, TMR film, etc.). The magnetic recording device is equipped with a magnetic recording medium having excellent corrosion resistance and a magnetic head having a steep field gradient, and as a result it is possible to achieve excellent corrosion resistance.

In another exemplary embodiment, a surfactant was added to the composition described in exemplary embodiment 1. The surfactants used were: dodecyl sulfate, stearic acid, toluenesulfonate, cetyltrimethyl ammonium salt, tetramethylammonium hydroxide, lauryl betaine, polyethylene glycol, and polyvinyl alcohol. The concentration was 1 g/L. The treatment time was 5 minutes. When a surfactant was added, the corrosion-resistance rank was A (compared to B without the addition thereof), so corrosion resistance was improved by adding a surfactant.

In another comparative example, the protective film B was carbon and an evaluation was carried out without the provision of an organic material layer (sample 2-1). The results showed a corrosion-resistance rank of D and extremely poor corrosion resistance.

According to another comparative example, another surface treatment method was used instead of using a heterocyclic compound to form the organic layer in the magnetic region/filler region shown in FIG. 5A. The basic composition and film thickness were otherwise the same as in the first exemplary embodiment. The recording layer was lost in each case and it was not possible to produce a disk as shown in Table 6.

TABLE 6

| Sample | Surface Treatment of Magnetic Region of Recording Layer | Corrosion-Resistance Rank |
|---|---|---|
| 8-1 | Chromic Acid (Chromate Treatment) | N.G. |
| 8-2 | Chromium Chloride (Trivalent Chromate) | N.G. |
| 8-3 | Zirconium Phosphate Treatment | N.G. |
| 8-4 | Zinc Phosphate Treatment | N.G. |

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method for producing a magnetic recording medium, the method comprising:
   forming a magnetic material layer above a substrate;
   transferring an uneven pattern to the magnetic material layer to form concave portions and convex portions, the convex portions being magnetic regions;
   forming a laminate layer on sidewalls of the concave portions of the magnetic material layer, the laminate layer including an organic material layer and an oxide layer and/or hydroxide layer deposited after the organic material layer thereby sandwiching the organic material layer between the magnetic material layer and the oxide layer and/or hydroxide layer;
   wherein the organic material layer exhibits a corrosion-inhibiting characteristic with respect to cobalt or cobalt alloy; and
   depositing a nonmagnetic material within the concave portions to form nonmagnetic regions.

2. The method as recited in claim 1, wherein the organic material layer and/or the oxide layer and/or hydroxide layer are formed by immersing the magnetic material layer in, or spraying the magnetic material layer with, a liquid comprising the corrosion-inhibiting organic material, an oxidant and a surfactant, or an organic material and an oxidant.

3. The method as recited in claim 2, wherein the oxidant comprises at least one of: hydrogen peroxide, chloric acid, perchloric acid, persulfuric acid, nitric acid and salts thereof, and ceric ammonium nitrate.

4. The method as recited in claim 2, wherein the surfactant comprises at least one of: an ionic surfactant, a cationic surfactant, an amphoteric surfactant, and a non-ionic surfactant, and wherein the anionic surfactant comprises at least one of: dodecyl sulfate, stearic acid, and toluenesulfonate, wherein the cationic surfactant comprises at least one of: cetyltrimethyl ammonium salt and tetramethylammonium hydroxide, wherein the amphoteric surfactant comprises lauryl betaine, and wherein the non-ionic surfactant comprises at least one of: polyethylene glycol and polyvinyl alcohol.

5. The method as recited in claim 1, wherein the organic material layer and/or the oxide layer and/or hydroxide layer are formed in the presence of ultrasonic waves.

6. The method as recited in claim 1, wherein the corrosion-inhibiting organic material comprises a heterocyclic compound having nitrogen groups.

7. The method as recited in claim 6, wherein the heterocyclic compound having nitrogen groups comprises at least one of: benzotriazole; 1,2,3-triazole; 1,2,3,4-tetrazole; 3-amino-1,2,4-triazole; nitro-1H-benzotriazole; carboxy benzotriazole; 5-methyl-benzotriazole; and uric acid.

8. The method as recited in claim 1, wherein the organic material layer and the oxide layer and/or hydroxide layer are only formed on side walls of each concave portion of the magnetic material layer.

9. The method as recited in claim 1, wherein the organic material layer and the oxide layer and/or hydroxide layer are formed on side walls and a bottom surface of each concave portion of the magnetic material layer.

10. The method as recited in claim 1, wherein within each concave portion, the oxide and/or hydroxide layer is positioned between the organic material layer and the nonmagnetic material.

11. The method as recited in claim 1, wherein the oxide layer and/or hydroxide layer has a thickness of at least about 1 nm.

12. The method as recited in claim 1, further comprising:
forming an interlayer below the magnetic material layer and above the substrate;
forming a seed layer below the interlayer and above the substrate; and
forming an adhesion layer below the seed layer and above the substrate.

13. The method as recited in claim 1, further comprising forming a protective film on a bottom surface of each concave portion, wherein the protective film is positioned below the nonmagnetic material within each concave portion.

14. The method as recited in claim 13, wherein the protective film includes at least one of: Cr, Ti, Ni, Mo, Nb, W, Ta, and Zr.

15. The method as recited in claim 1, further comprising forming a protective layer above the magnetic material layer.

16. The method as recited in claim 15, wherein the protective layer include diamond like carbon.

17. The method as recited in claim 15, further comprising forming a lubrication layer above the protective layer.

* * * * *

UNITED STATES PATENT AND TRADEMARK OFFICE
CERTIFICATE OF CORRECTION

PATENT NO. : 9,275,670 B2
APPLICATION NO. : 14/223851
DATED : March 1, 2016
INVENTOR(S) : Dai et al.

Page 1 of 1

It is certified that error appears in the above-identified patent and that said Letters Patent is hereby corrected as shown below:

In the specification:

col. 6, line 47, replace "(50 at %" with --(50at%--;

col. 10, line 38, replace "µ/L a was" with --µ/L was--.

Signed and Sealed this
Twenty-third Day of August, 2016

Michelle K. Lee
*Director of the United States Patent and Trademark Office*